(12) United States Patent
Tashiro et al.

(10) Patent No.: US 7,867,388 B2
(45) Date of Patent: Jan. 11, 2011

(54) CONTAMINATED FLUID RECOVERY APPARATUS

(75) Inventors: Minoru Tashiro, Tokyo (JP); Makoto Tashiro, Tokyo (JP)

(73) Assignee: BURNI Incorporation (JP)

( * ) Notice: Subject to any disclaimer, the term of this patent is extended or adjusted under 35 U.S.C. 154(b) by 809 days.

(21) Appl. No.: 11/878,007

(22) Filed: Jul. 20, 2007

(65) Prior Publication Data
US 2008/0251435 A1 Oct. 16, 2008

Related U.S. Application Data

(63) Continuation of application No. PCT/JP2006/316884, filed on Aug. 28, 2006.

(30) Foreign Application Priority Data

Dec. 22, 2005 (JP) .............................. 2005-370066
Apr. 12, 2006 (JP) .............................. 2006-109866

(51) Int. Cl.
   *B01D 21/18* (2006.01)
   *B24B 55/03* (2006.01)
(52) U.S. Cl. ............... 210/138; 210/167.03; 210/172.2; 210/223; 210/298; 210/526; 210/396
(58) Field of Classification Search ............ 210/167.03, 210/171, 172.2, 222, 223, 298, 525, 526, 210/396, 138, 695
See application file for complete search history.

(56) References Cited

U.S. PATENT DOCUMENTS 4,154,682 A 5/1979 Matsuoka 5,496,470 A 3/1996 Lenhart

FOREIGN PATENT DOCUMENTS

| DE | 26 31 945 | 1/1978 |
|---|---|---|
| FR | 2 583 309 | 12/1986 |
| JP | 57-038908 | 3/1982 |
| JP | 63-98706 | 6/1988 |
| JP | 63-103936 | 7/1988 |
| JP | 5-39844 | 5/1993 |
| JP | 07-328672 | 12/1995 |
| JP | 09141015 A * | 6/1997 |

(Continued)

OTHER PUBLICATIONS

English Translation of JP 63-098706, filed Jun. 1988.*

(Continued)

*Primary Examiner*—Terry K Cecil
(74) *Attorney, Agent, or Firm*—Bacon & Thomas, PLLC

(57) ABSTRACT

A contaminated fluid recovery apparatus includes a sludge removal mechanism having a dirty tank, a conveyor, and a magnetic drum which is arranged in the fluid circulating section. The contaminated fluid recovery apparatus is provided with an overflow tank. The overflow tank has a function to keep a fluid surface of the dirty tank in a position higher than the fluid circulating section and the magnetic drum. The magnetic drum is located horizontally between a lower portion and an upper portion of the conveyor. The conveyor scrapes out chips deposited on a bottom portion of the dirty tank toward an exit section. A scraping member, which is in contact with the magnetic drum, drops sludge attracted to the magnetic drum toward the lower portion of the conveyor.

7 Claims, 5 Drawing Sheets

FOREIGN PATENT DOCUMENTS

| | | |
|---|---|---|
| JP | 2005-66820 | 3/2005 |
| JP | 2005-66820 A | 3/2005 |

OTHER PUBLICATIONS

English Translation of JP 2005-66820 A, filed Mar. 2005.*
Search Report of Korean Patent Office regarding KR 2007-7019090, Jan. 13, 2009.
International Search Report dated Sep. 19, 2006 in PCT/JP2006/316884.
Search Report of Austrian Patent Office regarding Singapore Patent Application No. 200705238-4, May 9, 2008.
Office Action of Chinese Patent office in Chinese Patent Application No. 2006800056937, Aug. 8, 2000.

* cited by examiner

CONTAMINATED FLUID RECOVERY APPARATUS

CROSS REFERENCE TO RELATED APPLICATIONS

This is a Continuation Application of PCT application Ser. No. PCT/JP2006/316884, filed Aug. 28, 2006, which was published under PCT Article 21(2) in Japanese.

This application is based upon and claims the benefit of priority from prior Japanese Patent Applications No. 2005-370066, filed Dec. 22, 2005; and No. 2006-109866, filed Apr. 12, 2006, the entire contents of both of which are incorporated herein by reference.

BACKGROUND OF THE INVENTION

1. Field of the Invention

The present invention relates to a contaminated fluid recovery apparatus for decontaminating a contaminated fluid in which chips, fine sludge, etc., are mixed, for example.

2. Description of the Related Art

A machine tool or the like for machining, such as cutting, grinding, etc., uses a fluid such as a coolant for cooling a workpiece. This fluid is mixed with foreign matter, such as chips (shavings) produced by machining, fine sludge, etc. In order to reuse the contaminated fluid that contains the chips, sludge, etc., a contaminated fluid recovery apparatus is used to remove the chips, sludge, etc., from the contaminated fluid.

The inventors hereof have long been developing contaminated fluid recovery apparatuses. In consequence, they have succeeded in developing a high-performance contaminated fluid recovery apparatus that combines a conveyor and a sludge removal mechanism provided with a magnetic drum, as described in Jpn. Pat. Appln. KOKAI Publication No. 2005-66820, for example.

The sludge removal mechanism includes the magnetic drum that is located at a circulating section (overflow section) near the fluid surface of a dirty tank. Fine magnetic sludge in a contaminated fluid is attracted to the outer peripheral surface of the magnetic drum. The conveyor is provided with scrapers. Relatively large chips and the like that are deposited on the bottom of the dirty tank are scraped out by the scrapers toward an exit section outside the dirty tank.

Some contaminated fluids may contain ultrafine particles, such as very fine carbon particles. While the contaminated fluid recovery apparatus is operating, these ultrafine particles tend to adhere to fine air bubbles and the like mixed in the contaminated fluid, proceed toward the fluid surface of the dirty tank, and float for hours on the fluid surface. If the sludge removal mechanism is located at the circulating section (overflow section) near the fluid surface of the dirty tank, the ultrafine particles that exist near the fluid surface inevitably flow into the side of a clean tank through the circulating section.

Even if these ultrafine particles get into the clean tank, the contaminated fluid recovery apparatus can exhibit high performance without any particular practical problem. As higher specifications will be required of the contaminated fluid recovery apparatuses in the future, however, there will possibly be a demand for contaminated fluid recovery apparatuses that can capture smaller ultrafine particles.

BRIEF SUMMARY OF THE INVENTION

The object of the present invention is to provide a contaminated fluid recovery apparatus capable of removing very fine particles in a fluid, not to mention relatively large chips.

A contaminated fluid recovery apparatus of the present invention comprises a dirty tank which contains a fluid to be cleaned, an exit section provided in a position higher than a fluid surface of the dirty tank, a conveyor having a scraper which scrapes out an objects of removal deposited on a bottom portion of the dirty tank toward the exit section and including a lower portion, which moves along the bottom portion of the dirty tank toward the exit section, and an upper portion, which moves toward a starting end of the lower portion via a region over the lower portion, a fluid circulating section which connects the inside and outside of the dirty tank, a sludge removal mechanism including a magnetic drum which is located between the lower portion and the upper portion of the conveyor in the vicinity of the fluid circulating section in the dirty tank and is rotationally driven, fluid surface retaining means which keeps the fluid surface of the dirty tank in a position higher than the fluid circulating section and the magnetic drum, and a scraping member which is provided in the dirty tank, scrapes off sludge by contacting an outer peripheral surface of the magnetic drum, and drops the sludge toward the lower portion of the conveyor.

According to the present invention, chips and the like deposited on the bottom portion of the dirty tank, among the objects of removal mixed in the fluid, are removed by the conveyor. Fine magnetic sludge floating in the contaminated fluid is captured by the magnetic drum of the sludge removal mechanism as it passes through the fluid circulating section. Since the magnetic drum is immersed in the fluid, the outer peripheral surface of the magnetic drum can be effectively utilized as a sludge attracting surface.

As the chips and sludge that are scraped out by the conveyor emerge from the fluid surface, some of fine particles of, for example, carbon that float on the fluid surface of the dirty tank adhere to the chips and sludge and are carried up to the exit section.

When the operation of the contaminated fluid recovery apparatus is stopped, some of the fine particles floating on the fluid surface of the dirty tank sink in the contaminated fluid and adhere to the chips, sludge, etc., that are deposited on the bottom portion of the dirty tank. When the operation of this apparatus is restarted, the fine particles adhering to the chips and sludge are scraped out together with the chips and sludge toward the exit section by the conveyor. For these reasons, ultrafine particles that cannot be easily removed by the conveyor can also be removed effectively.

In a preferred form of this invention, the fluid surface retaining means is an overflow tank which communicates with the dirty tank through the fluid circulating section, and the fluid decontaminated through the sludge removal mechanism is fed into a clean tank through the overflow tank.

The magnetic drum should preferably be located in a horizontal posture between the lower portion and the upper portion of the conveyor so that an axis thereof extends along the moving direction of the scraper of the conveyor.

In an aspect of the present invention, the conveyor is movable in a first direction and a second direction opposite to the first direction. The conveyor is moved in the first direction and the second direction by a rotary drive mechanism that includes a reversible motor. The rotary drive mechanism is switched between the first direction and the second direction by switching means such as a timer.

If the conveyor is configured to be switchable between the first direction and the second direction, the emerging chips and the like that are floating on the fluid surface of the dirty tank can be adhered to the scraper or the like of the conveyor as they are moved toward the exit section when the conveyor moves in the second direction.

An example of the fluid surface retaining means is an overflow tank which communicates with the dirty tank through the fluid circulating section. As the fluid overflows the overflow tank, the fluid surface of the dirty tank is situated corresponding to the upper portion of the conveyor.

In an aspect of the present invention, a first guide plate is formed extending diagonally upward along the lower portion of the conveyor from of the dirty tank toward the exit section, and a second guide plate is formed extending diagonally upward along the upper portion of the conveyor. The scraper of the conveyor is configured to be in contact with the respective upper surfaces of these guide plates.

In order to further enhance filtering degree, a filter drum may be contained in a filter tank into which the fluid filtered by the sludge removal mechanism is introduced. The filter drum is provided with a filter. The filter is composed of a porous plate with a large number of through holes formed therein. The porous plate is formed in a cylindrical shape. Respective inlets of the through holes open in an outer peripheral surface of the cylindrically formed porous plate. Respective outlets of the through holes open in an inner peripheral surface of the porous plate. The through holes are formed by, for example, etching.

Sludge that is produced when a carburized and quenched material is ground contains ferromagnetic or paramagnetic substances as well as magnetic substances. The sludge of this type cannot be thoroughly removed by the magnetic drum only. According to the one form of the present invention provided with the filter drum, however, a cleaner fluid can be obtained by filtering the sludge that contains non-magnetic or paramagnetic substances by means of the filter drum.

DETAILED DESCRIPTION OF THE INVENTION

A first embodiment of the present invention will now be described with reference to FIGS. 1 and 2.

Figure 1:
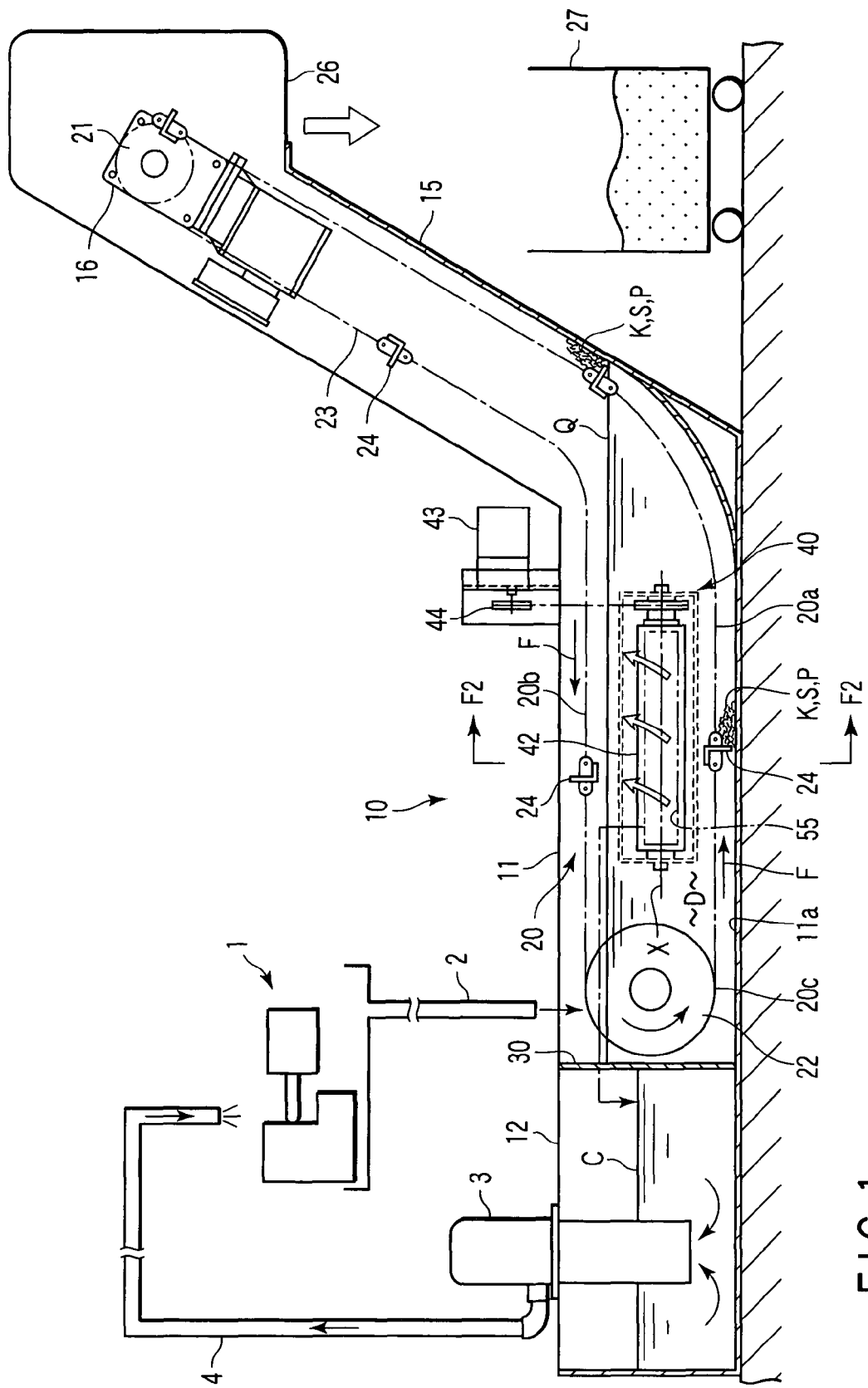
FIG. 1 is a sectional view of a contaminated fluid recovery apparatus according to a first embodiment of the present invention.

FIG. 1 shows an outline of a recovery system that removes foreign matter from a coolant used in a machine tool 1, such as a machining center, thereby making the coolant reusable. The contaminated coolant discharged from the machine tool 1 is an example of a contaminated fluid D to be cleaned. The contaminated fluid D contains chips produced by cutting or the like, foreign matter including fine sludge such as iron powder, and fine or ultrafine particles of carbon or the like.

The contaminated fluid D is fed from the machine tool 1 to a contaminated fluid recovery apparatus 10 through a discharge passage 2. The contaminated fluid recovery apparatus 10 serves to decontaminate the contaminated fluid D. A cleaned fluid C that is decontaminated by the contaminated fluid recovery apparatus 10 is fed again to the machine tool 1 through a supply passage 4 after being pumped up by a pump 3.

The following is a detailed description of the contaminated fluid recovery apparatus 10 used in the recovery system. As shown in FIGS. 1 and 2, the contaminated fluid recovery apparatus 10 includes a dirty tank 11, which contains the contaminated fluid D, and a clean tank 12 located adjacent to the dirty tank 11. The contaminated fluid D is fed from the downstream end of the discharge passage 2 into the dirty tank 11.

A scooping section 15 is formed at an end portion of the dirty tank 11. The scooping section 15 extends diagonally upward from the end portion of the dirty tank 11. A rotary drive mechanism 16 that is driven by a motor is provided at the top of the scooping section 15.

A conveyor 20 is provided extending along a bottom portion 11a of the dirty tank 11 and the scooping section 15. The conveyor 20 includes a chain 23 as an example of winding transmission means and scrapers 24 attached to the chain 23. The chain 23 endlessly travels between an upper sprocket 21 and a lower sprocket 22. The chain 23 is moved in the direction indicated by arrow F in FIG. 1 by the rotary drive mechanism 16. The chain 23 is guided by guide members 25 in its moving direction. The guide members 25 are located on the bottom portion 11a of the dirty tank 11.

The scrapers 24 are arranged at regular intervals in the longitudinal direction of the chain 23. Relatively large chips K (typically shown in FIG. 2) to be removed settle on the bottom portion 11a of the dirty tank 11. The chips K, along with sludge and the like, are carried out into an exit section 26 through the scooping section 15 by the scrapers 24. The exit section 26 is located outside the dirty tank 11. The exit section 26 situated in a position higher than a fluid surface Q of the dirty tank 11. The chips, sludge, etc., having reached the exit section 26 drop from the exit section 26 toward a recovery box 27.

The conveyor 20 includes a lower portion (outward portion) 20a and an upper portion (inward portion) 20b. The lower portion 20a of the conveyor 20 moves along the bottom portion 11a of the dirty tank 11 toward the exit section 26. The upper portion 20b of the conveyor 20 moves from the exit section 26 toward a starting end 20c of the lower portion 20a via a region over the lower portion 20a. A lower sprocket 22 is located at the starting end 20c.

As shown in FIG. 1, the clean tank 12 is formed adjacent to the dirty tank 11. The clean tank 12 is separated from the dirty tank 11 by a partition plate 30. As shown in FIG. 2, an overflow tank 31 that functions as fluid surface retaining means is attached to the flank of the dirty tank 11. The cleaned fluid C that is decontaminated through a sludge removal mechanism 40 (mentioned later) flows through the overflow tank 31 into the clean tank 12.

The overflow tank 31 communicates with the dirty tank 11 through a fluid circulating section 32. If the level of the fluid surface Q of the dirty tank 11 exceeds a predetermined height, the cleaned fluid C overflows an upper end 31a of the overflow tank 31. As the overflowing cleaned fluid C flows into the clean tank 12, the fluid surface Q of the dirty tank 11 is kept at the predetermined height. The fluid surface Q of the dirty tank 11 is kept at a position higher than the fluid circulating section 32 and a magnetic drum 42 by the overflow tank 31.

The dirty tank 11 is provided with the sludge removal mechanism 40. The sludge removal mechanism 40 of this embodiment is provided with the magnetic drum 42, a motor 43 (shown in FIG. 1), a power transmission system 44, a scraping member 45, etc. The magnetic drum 42 is contained in the dirty tank 11. The motor 43 rotates the magnetic drum 42 in the direction of arrow A in FIG. 2. The power transmission system 44 transmits the rotation of the motor 43 to the magnetic drum 42. The scraping member 45 is provided in the dirty tank 11.

The magnetic drum 42 is a cylinder of a nonmagnetic material, such as stainless steel. A magnet 46 which has a strong magnetism is located in the magnetic drum 42. A gap is defined between the outer surface of the magnet 46 and the inner peripheral surface of the magnetic drum 42. The magnet 46 is fixed to a frame 47 that is attached to the dirty tank 11. The magnetic drum 42 rotates relatively to the magnet 46 in the direction of arrow A.

In the vicinity of the fluid circulating section 32 in the dirty tank 11, the magnetic drum 42 is located between the lower portion 20a and the upper portion 20b of the conveyor 20. More specifically, an axis X of the magnetic drum 42 is extending along the moving direction (indicated by arrow F) as shown in FIG. 1. The magnetic drum 42 is supported in a substantially horizontal posture by the frame 47 (shown in FIG. 2) or the like. The entire periphery of the magnetic drum 42 is immersed in the contaminated fluid D.

Figure 2:
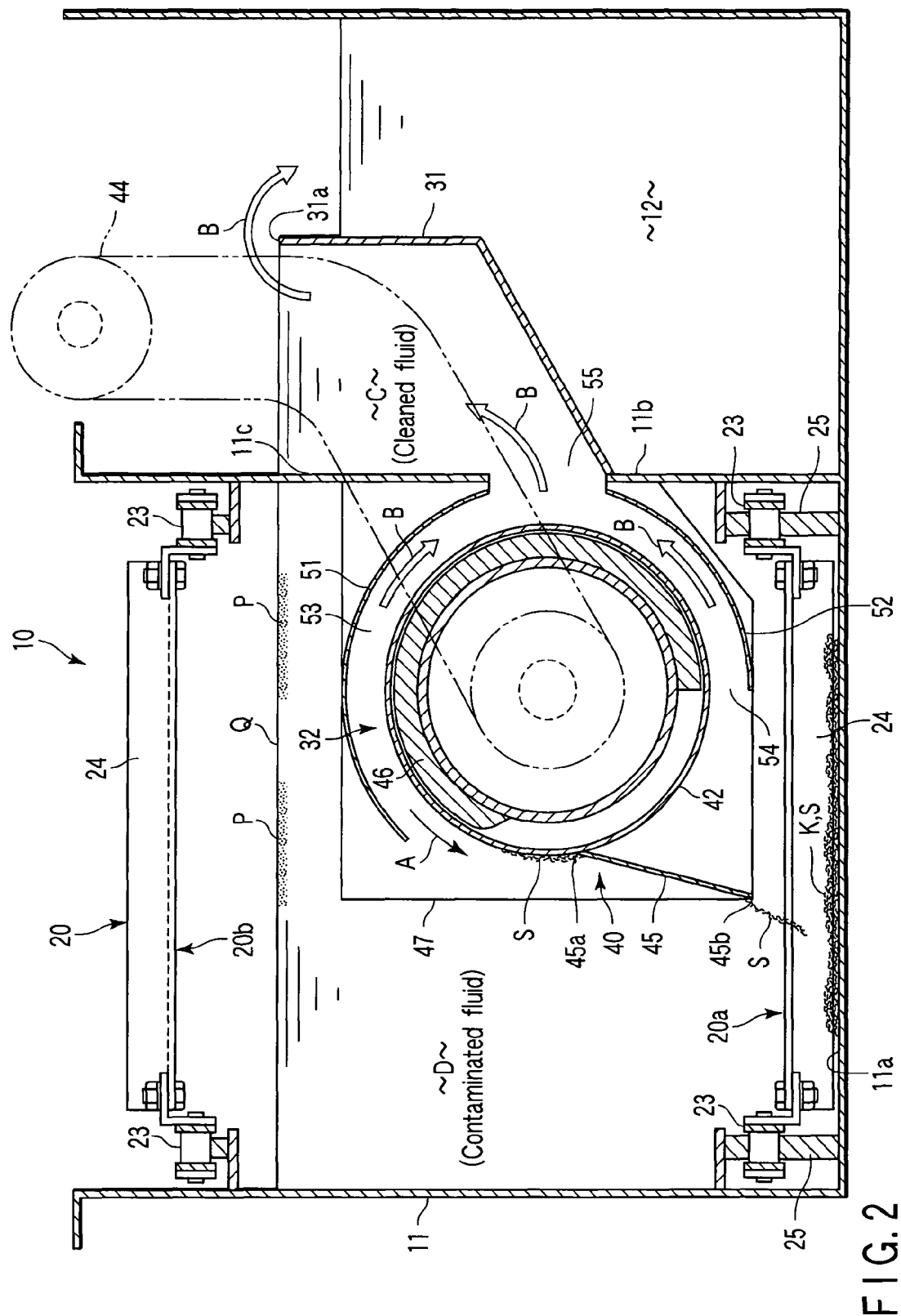
FIG. 2 is a sectional view of the contaminated fluid recovery apparatus taken along line F2-F2 of FIG. 1.

As shown in FIG. 2, an upper guide plate 51 and a lower guide plate 52 are arranged in the dirty tank 11. The guide plates 51 and 52 are curved in a circular arc so as to extend along the outer peripheral surface of the magnetic drum 42. An upper fluid passage 53 is formed between the upper guide plate 51 and the magnetic drum 42. A lower fluid passage 54 is formed between the lower guide plate 52 and the magnetic drum 42. In FIG. 2, arrow B indicates a direction in which a fluid flows.

The fluid passages 53 and 54 communicate with the overflow tank 31 through an opening 55. The opening 55 is formed in the sidewall 11b of the dirty tank 11. The fluid passages 53 and 54 and the opening 55 constitute the aforesaid fluid circulating section 32 for connecting the inside and outside of the dirty tank 11. The aforesaid magnetic drum 42 is located near the fluid circulating section 32.

As shown in FIG. 2, one end 45a of the scraping member 45 is in contact with the outer peripheral surface of the magnetic drum 42, substantially covering the overall axial length of the magnetic drum 42. The other end 45b of the scraping member 45 extends diagonally downward toward the lower portion 20a of the conveyor 20. The sludge and the like that adhere to the outer peripheral surface of the magnetic drum 42 are scraped off by the scraping member 45. The scraped-off sludge and the like drop toward the lower portion 20a of the conveyor 20.

The following is a description of the operation of the contaminated fluid recovery apparatus 10 constructed in this manner.

The contaminated fluid D discharged from the machine tool 1 is fed into the dirty tank 11 through the discharge passage 2. The chips K contained in the contaminated fluid D settle down onto the bottom portion 11a of the dirty tank 11 in a short time, as shown in FIG. 2. The chips K are conveyed along the scooping section 15 from the bottom portion 11a of the dirty tank 11 to the exit section 26 by the scrapers 24 of the conveyor 20. The chips K that are conveyed to the exit section 26 drop into the recovery box 27.

On the other hand, the contaminated fluid D in the dirty tank 11 proceeds toward the opening 55 through the fluid passages 53 and 54 between the outer peripheral surface of the magnetic drum 42 and the guide plates 51 and 52. As this is done, the fine magnetic sludge that floats in the contaminated fluid D is attracted to the outer peripheral surface of the magnetic drum 42 by the magnetic force of the magnet 46. Since the entire magnetic drum 42 is immersed in the fluid, both the upper and lower surfaces of the magnetic drum 42 can be effectively utilized as sludge attracting surfaces.

The cleaned fluid C that is decontaminated by the sludge removal mechanism 40 flows through the opening 55 into the overflow tank 31. Further, the cleaned fluid C overflows the upper end 31a of the overflow tank 31 and flows into the clean tank 12.

As the magnetic drum 42 rotates, the sludge S that is attracted to the outer peripheral surface of the magnetic drum 42 is scraped off by the scraping member 45. The scraped-off sludge S drops onto the lower portion 20a of the conveyor 20. The sludge S having dropped on the lower portion 20a of the conveyor 20 is scraped out toward the exit section 26 by the scrapers 24.

The scraping member 45 drops the sludge S, which is scraped away from the magnetic drum 42, toward the lower portion 20a of the conveyor 20. Thus, the sludge S can be prevented from running against the upper portion 20b of the conveyor 20 as it drops, so that a failure such that the sludge S rediffuses into the contaminated fluid D can be avoided.

The scrapers 24 that scrape out the chips K and the sludge S proceeds from within the contaminated fluid D toward the exit section 26 via the fluid surface Q. As the scrapers 24 passthrough the fluid surface Q, fine particles P floating on the fluid surface Q adhere to the chips K and the sludge S that move together with the scrapers 24. Thus, the fine particles P, along with the chips K and the sludge S, are delivered to the exit section 26.

In this manner, the contaminated fluid D in the dirty tank 11 is decontaminated and changed into the cleaned fluid C. The cleaned fluid C flows through the overflow tank 31 into the clean tank 12. The cleaned fluid C that is introduced into the clean tank 12 is pumped up by the pump 3 and fed again to the machine tool 1 through the supply passage 4. Since a partition wall 11c that divides the fluid surface Q and the overflow tank 31 is provided in an upper part of the dirty tank 11, the fine particles P floating on the fluid surface Q remain in the dirty tank 11 and can never flow into the clean tank 12.

If the operation of the machine tool 1 is suspended so that the contaminated fluid recovery apparatus 10 is stopped at night or on a holiday, the fine particles P having so far been floating on the fluid surface Q of the dirty tank 11 gradually settle down in the contaminated fluid D with the passage of time. The deposited fine particles P adhere to the chips and sludge deposited on the bottom portion 11a of the dirty tank 11.

If the operation of the machine tool 1 is restarted so that the contaminated fluid recovery apparatus 10 is actuated, the conveyor 20 starts to move. When the scrapers 24 of the conveyor 20 move, the fine particles P and ultrafine particles, deposited on the bottom portion 11a of the dirty tank 11, are scraped out together with the chips K and the sludge S toward the exit section 26 by the scrapers 24. Thus, even the ultrafine particles in the contaminated fluid D are thoroughly removed, so that the cleaned fluid C with very high purity can be obtained.

The magnetic drum 42 is located between the lower portion 20a and the upper portion 20b of the conveyor 20. The magnetic drum 42 is oriented so that its axis X extends along the moving direction (direction of arrow F) of the conveyor 20. Therefore, the internal space of the dirty tank 11 can be utilized effectively. Specifically, the height of the dirty tank 11 that contains the magnetic drum 42 can be reduced, and the magnetic drum 42 of which the dimension in the direction of the axis X is large can be located along the conveyor 20.

A contaminated fluid recovery apparatus 10' according to a second embodiment of the present invention will now be described with reference to FIGS. 3 to 5. Since the basic configurations and functions of the contaminated fluid recovery apparatus 10' are the same as those of the contaminated fluid recovery apparatus 10 of the first embodiment, common numerals are used to designate common portions that are shared with the first embodiment, and a description thereof is omitted. The following is a description of different configurations.

Figure 3:
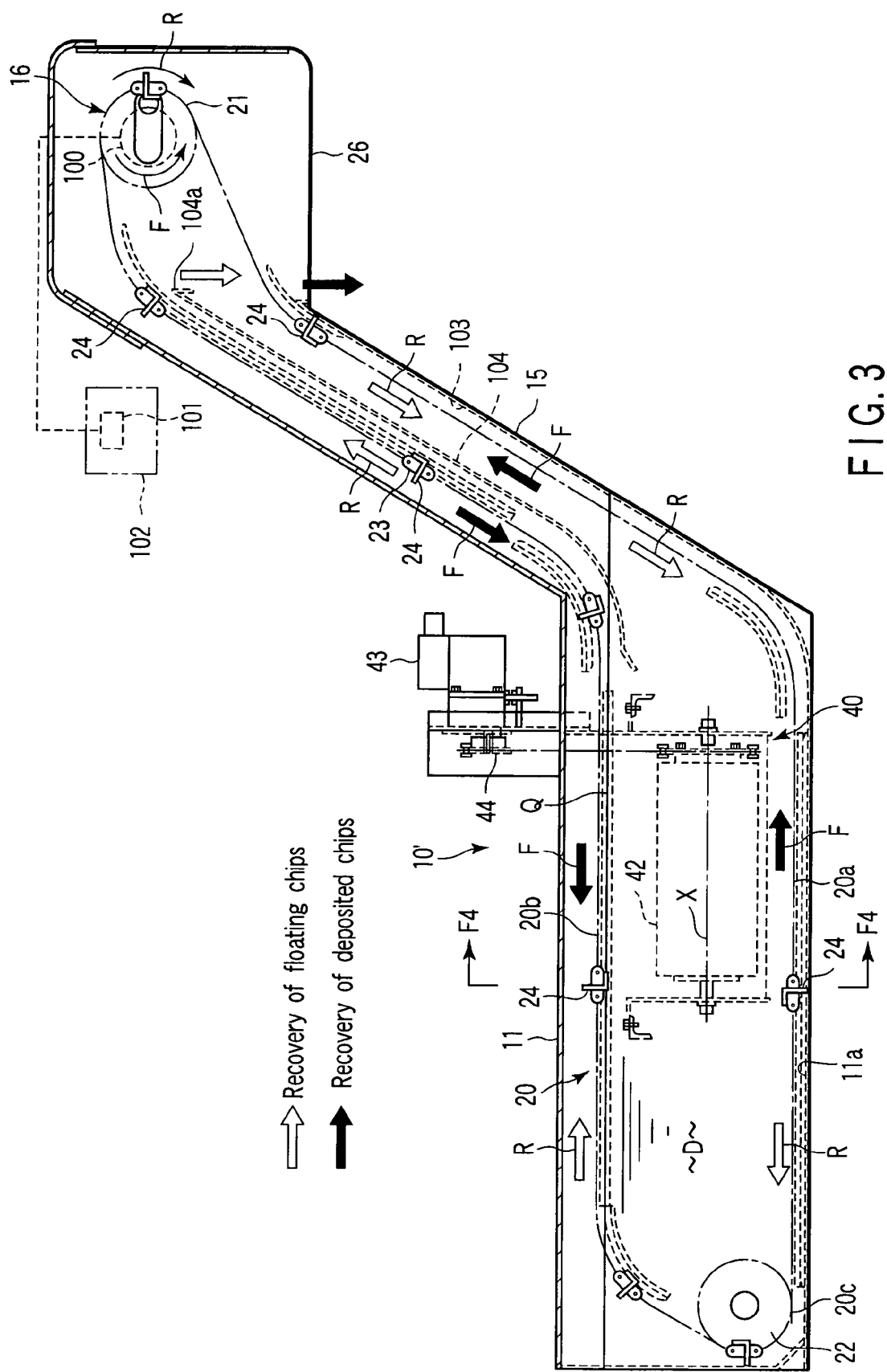
FIG. 3 is a sectional view of a contaminated fluid recovery apparatus according to a second embodiment of the present invention.

A conveyor 20 of the second embodiment is movable in a first direction indicated by arrow F in FIG. 3 and a second direction indicated by arrow R in FIG. 3. The conveyor 20 can be moved in the first direction F and the second direction R by a rotary drive mechanism 16. The rotary drive mechanism 16 includes a reversible motor 100. The motor 100 functions as a drive source. The motor 100 is constructed so that its rotation direction can be switched for each predetermined time by a controller 102 that includes a timer 101. The timer 101, which functions as switching means, has its timing (interval) for redirection such that the time is longer in the first direction F than in the second direction R.

An overflow tank 31 (shown in FIG. 4) functions as fluid surface retaining means. Specifically, the height of an upper end 31a of the overflow tank 31 is set so that a fluid surface Q of a dirty tank 11 during operation is situated on scrapers 24 at an upper portion 20b of the conveyor 20.

As shown in FIG. 3, a scooping section 15 is provided between the dirty tank 11 and an exit section 26. A first guide plate 103 and a second guide plate 104 are arranged in the scooping section 15. These guide plates 103 and 104 are vertically separated from each other. The first guide plate 103 extends diagonally upward along a lower portion 20a of the conveyor 20 from a bottom portion 11a of the dirty tank 11 toward the exit section 26. The second guide plate 104 extends diagonally upward along the upper portion 20b of the conveyor 20 from an upper part of the dirty tank 11 toward the exit section 26. An upper end portion 104a of the second guide plate 104 is situated over the exit section 26. The scrapers 24 of the conveyor 20 are individually in contact with the respective upper surfaces of these guide plates 103 and 104.

Figure 4:
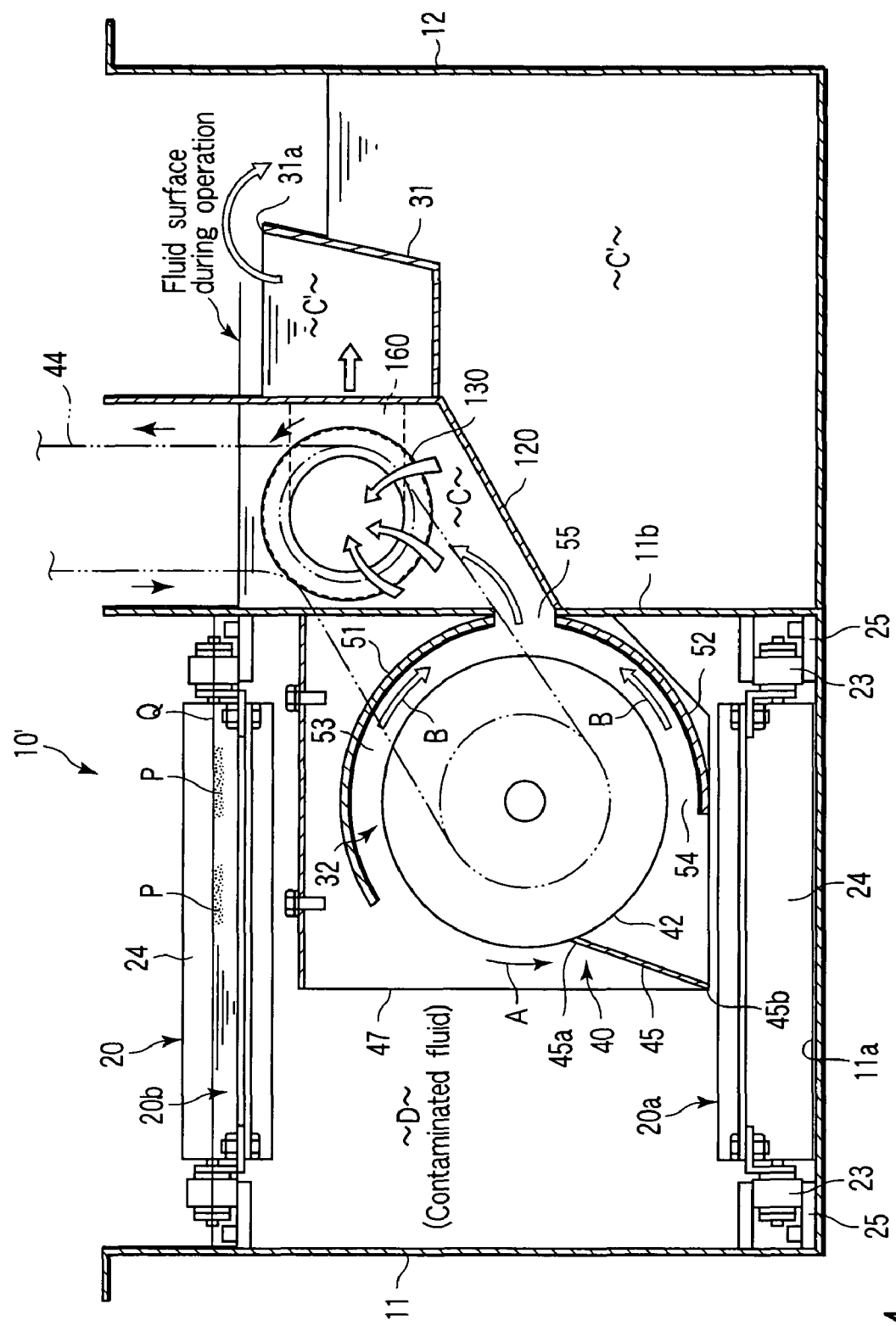
FIG. 4 is a sectional view of the contaminated fluid recovery apparatus taken along line F4-F4 of FIG. 3.

As shown in FIG. 4, a filter tank 120 is provided between the dirty tank 11 and the overflow tank 31. A fluid C that is filtered by a magnetic drum 42 flows into the filter tank 120 through an opening 55. A filter drum 130 is contained in the filter tank 120. The filter drum 130 is obtained by forming a porous plate 140 (part of which is shown in FIG. 5) that functions as a filter into a cylindrical shape. The filter drum 130 is supported for rotation around a horizontal axis by a bearing (not shown) that is attached to the filter tank 120. The filter drum 130 is rotationally driven together with the magnetic drum 42 by a power transmission system 44.

Figure 5:
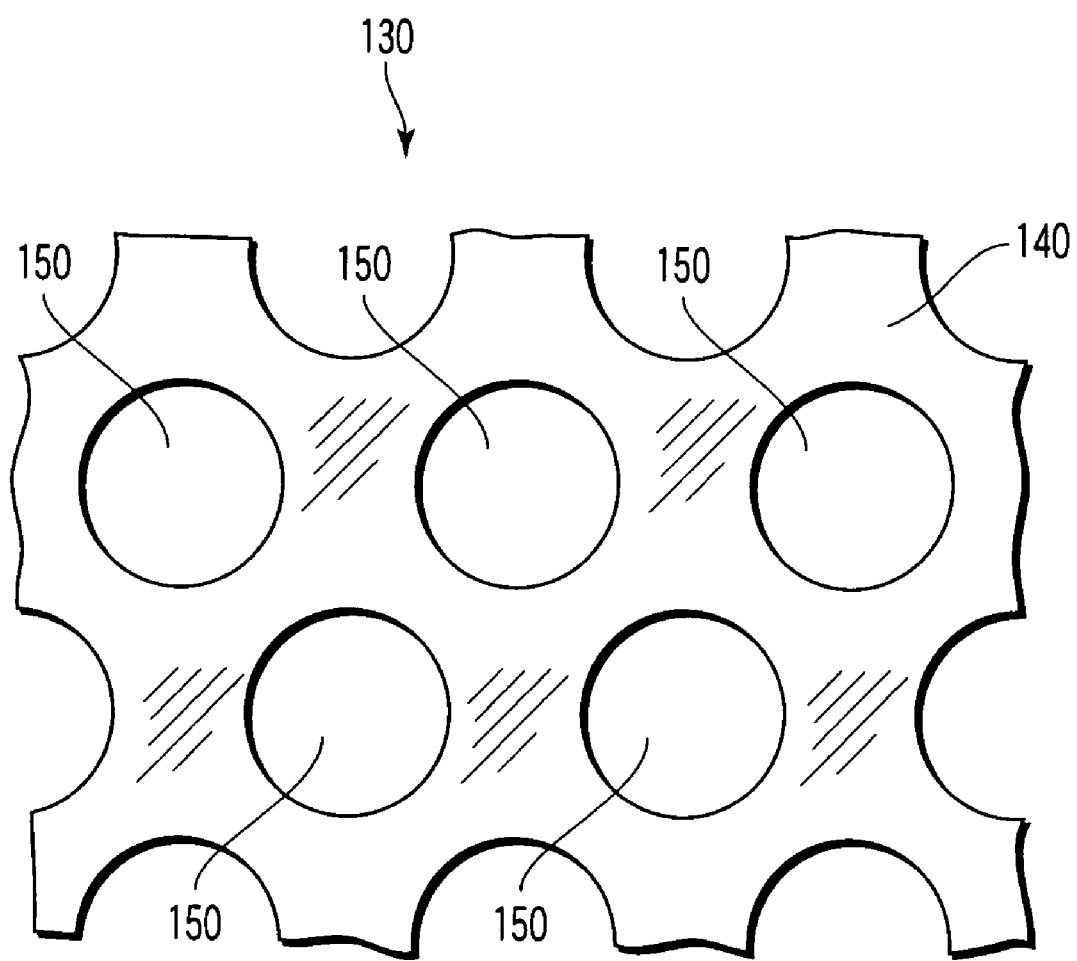
FIG. 5 is a plan view of a part of a porous plate of a filter drum.

As shown in FIG. 5, the porous plate 140 that functions as a filter has a large number of through holes 150 that are formed at predetermined pitches. The through holes 150 may be formed by, for example, photo-etching. Although an example of each through hole 150 is circular, a through hole of any other shape than a circular shape may be adopted instead. The diameter of the through hole 150 is also selected according to the application. An inlet of the through hole 150 opens in the outer peripheral surface of the cylindrically formed porous plate 140. An outlet of the through hole 150 opens in the inner peripheral surface of the cylindrically formed porous plate 140.

The following is a description of the operation of the contaminated fluid recovery apparatus 10' according to the second embodiment.

When the conveyor 20 moves in the first direction F, sludge, chips (deposited chips) and the like deposited on the bottom portion 11a of the dirty tank 11 is moved along the first guide plate 103 of the scooping section 15 toward the exit section 26 by the scrapers 24. The sludge and the like that are moved up to the exit section 26 drop from the exit section 26 toward the recovery box 27 (shown in FIG. 1). This point is shared with the contaminated fluid recovery apparatus 10 of the first embodiment.

When the conveyor 20 moves in the second direction R, fine sludge (floating small chips) floating near the fluid surface Q of the dirty tank 11 adheres to the scrapers 24. The sludge and the like adhering to the scrapers 24 move along the second guide plate 104 toward the exit section 26. The sludge and the like that are moved up to the exit section 26 drop from the upper end portion 104a of the second guide plate 104 toward the exit section 26.

In the present embodiment, the scooping section 15 is provided with the second guide plate 104. As the conveyor 20 moves in the second direction R, the sludge (floating chips, etc.) adhering to the conveyor 20 can be restrained from dropping from the scrapers 24 into the dirty tank 11. Thus, the floating chips adhering to the scrapers 24 can be efficiently moved up to the upper end portion 104a of the second guide plate 104.

The fluid C that is filtered through the magnetic drum 42 of a sludge removal mechanism 40 flows into the filter tank 120 through the opening 55. The fluid C that is introduced into the filter tank 120 passes through the through holes 150 at a relatively low speed, from outside the filter drum 130 into the filter drum 130. As the fluid C flows into the filter drum 130, relatively large objects of filtering in the fluid C are captured near the inlets of the through holes 150. Fine particles and the like in the fluid C are captured by adhering to the relatively large objects of filtering that are caught by the through holes 150.

Thus, an ultra-clean fluid C' that is substantially thoroughly filtered flows slowly into the filter drum 130. The ultra-clean fluid C' that is introduced into the filter drum 130 flows into the overflow tank 31 through a circulating section 160. The ultra-clean fluid C' in the overflow tank 31 overflows the upper end 31a of the overflow tank 31 and flows into a clean tank 12.

As the filter drum 130 rotates in the fluid C, the objects of filtering, adhering to the outer peripheral surface of the cylindrical filter drum 130, are easily separated from the porous plate 140 by the fluid C that relatively flows around the filter drum 130, a centrifugal force caused by the rotation of the filter drum 130, etc.

In carrying out this invention, it is to be understood that the components of the contaminated fluid recovery apparatus, including the conveyor, fluid circulating section, sludge removal mechanism, fluid surface retaining means, filter drum, etc., as well as the dirty tank, may be embodied in variously modified forms without departing from the spirit of the invention.

What is claimed is:

1. A contaminated fluid recovery apparatus comprising:
   a dirty tank which contains a fluid to be cleaned;
   an exit section provided in a position higher than a fluid surface (0) of the dirty tank ;
   a conveyor having a scraper which scrapes out objects of removal deposited on a bottom portion of the dirty tank toward the exit section and including a lower portion, which moves along the bottom portion of the dirty tank toward the exit section and an upper portion, which moves toward a starting end of the lower portion via a region over the lower portion;

a fluid circulating section having an opening which connects the inside and outside of the dirty tank;

a sludge removal mechanism including a magnetic drum which is located between the lower portion and the upper portion of the conveyor in the vicinity of the fluid circulating section in the dirty tank and is rotationally driven;

fluid surface retainer means which keeps the fluid surface (Q) of the dirty tank in a position higher than the fluid circulating section and the magnetic drum;

the magnetic drum is located in a substantially horizontal posture between the lower portion and the upper portion of the conveyor so that an axis (X) thereof extends along the moving direction of the scraper of the conveyor and the entire periphery of the magnetic drum is immersed in the contaminated fluid (D) in the dirty tank;

an upper guide plate and a lower guide plate are arranged in the dirty tank, the guide plates are curved in a circular arc so as to extend partially circumiacent the outer peripheral surface of the magnetic drum;

an upper fluid passage which communicates with the opening is formed between the upper guide plate and the magnetic drum and a lower fluid passage which communicates with the opening is formed between the lower guide plate and the magnetic drum the contaminated fluid (D) in the dirty tank proceeds toward the opening through the upper and lower fluid passages.

2. A contaminated fluid recovery apparatus according to claim 1, wherein the fluid surface retainer means is an overflow tank which communicates with the dirty tank through the fluid circulating section , and the fluid decontaminated through the sludge removal mechanism is fed into a clean tank through the overflow tank.

3. A contaminated fluid recovery apparatus according to claim 2, wherein the conveyor is movable in a first direction and a second direction opposite to the first direction, includes a rotary drive mechanism for moving the conveyor in the first direction and the second direction and switch means for switching the rotary drive mechanism between the first direction and the second direction, and is provided with the fluid surface retainer means for situating the fluid surface (Q) of the dirty tank at the upper portion of the conveyor.

4. A contaminated fluid recovery apparatus according to claim 3, wherein the rotary drive mechanism includes a reversible motor for use as a drive source, and the switch means includes a timer for switching the direction of rotation of the motor.

5. A contaminated fluid recovery apparatus according to claim 1, wherein the conveyor is movable in a first direction and a second direction opposite to the first direction, includes a rotary drive mechanism for moving the conveyor in the first direction and the second direction and switch means for switching the rotary drive mechanism between the first direction and the second direction, and is provided with the fluid surface retainer means for situating the fluid surface (Q) of the dirty tank at the upper portion of the conveyor.

6. A contaminated fluid recovery apparatus according to claim 5, wherein the rotary drive mechanism includes a reversible motor for use as a drive source, and the switch means includes a timer for switching the direction of rotation of the motor.

7. A contaminated fluid recovery apparatus according to claim 1, further comprising a filter tank into which the fluid filtered by the sludge removal mechanism is introduced and a filter drum contained in the filter tank, the filter drum including a filter which is obtained by forming a porous plate with a large number of through holes formed therein into a cylindrical shape, respective inlets of the through holes opening in an outer peripheral surface of the porous plate and outlets in an inner peripheral surface of the porous plate.

* * * * *